(12) United States Patent
Tarabocchia

(10) Patent No.: US 6,374,872 B1
(45) Date of Patent: Apr. 23, 2002

(54) APPARATUS FOR CLEANING AND FLUSHING A TRANSMISSION

(75) Inventor: Bruno J. Tarabocchia, Palm Harbor, FL (US)

(73) Assignee: Mega Products, Inc., Oldsmar, FL (US)

( * ) Notice: Subject to any disclaimer, the term of this patent is extended or adjusted under 35 U.S.C. 154(b) by 0 days.

(21) Appl. No.: 09/869,339

(22) PCT Filed: Mar. 17, 1999

(86) PCT No.: PCT/US99/05801

§ 371 Date: Jun. 26, 2001

§ 102(e) Date: Jun. 26, 2001

(51) Int. Cl.[7] .................................................. B65B 1/04
(52) U.S. Cl. ............................ 141/98; 141/65; 141/89; 184/1.5
(58) Field of Search .................................. 141/98, 65, 85, 141/89, 91, 92, 67; 184/1.5

(56) References Cited

U.S. PATENT DOCUMENTS

| | | |
|---|---|---|
| 4,174,231 A | 11/1979 | Hobgood |
| 4,854,277 A | 8/1989 | Kenney |
| 4,951,784 A | 8/1990 | Bedi |
| 5,044,334 A | 9/1991 | Bedi |
| 5,062,500 A | 11/1991 | Miller |
| 5,070,831 A | 12/1991 | Yunick |
| 5,154,775 A | 10/1992 | Bedi |
| 5,209,198 A | 5/1993 | Bedi |
| 5,291,968 A | 3/1994 | Brown |
| 5,318,080 A | 6/1994 | Viken |
| 5,370,160 A | 12/1994 | Parker |
| 5,427,202 A | 6/1995 | Benring |
| 5,447,184 A | 9/1995 | Betancourt |
| 5,456,295 A | 10/1995 | Taylor |
| 5,472,014 A | 12/1995 | Viken |
| 5,522,474 A | 6/1996 | Burman |
| 5,535,849 A | 7/1996 | Few |
| 5,546,999 A | 8/1996 | Parker |
| 5,566,781 A | 10/1996 | Robert |
| 5,626,170 A | 5/1997 | Parker |

*Primary Examiner*—Steven O. Douglas
(74) *Attorney, Agent, or Firm*—J. David Haynes

(57) ABSTRACT

An apparatus for removing used transmission fluid from an automatic transmission of a motor vehicle wherein a cylindrical reservoir having a rotating wand therein for dividing the reservoir into two chambers, said first chamber being connected to the transmission fluid outlet of the transmission and said second chamber being connected to the fluid input of a transmission fluid cooler wherein the second chamber is initially filled with fresh fluid forcing the wand toward the first chamber and wherein the fluid exiting the transmission due to the pump in the transmission fills the first chamber and forces the wand to rotate to expel fresh fluid form the second chamber into the cooler and the transmission.

7 Claims, 8 Drawing Sheets

APPARATUS FOR CLEANING AND FLUSHING A TRANSMISSION

BACKGROUND

1. Field of Invention

This invention relates to an apparatus for changing transmission fluid, and, optionally, flushing the transmission components and exchanging the fluid with fresh fluid.

2. Description of Prior Art

Many consumer and industrial devices use automatic transmissions filled with automatic transmission fluid (ATF) as the working fluid. At regular intervals, this automatic transmission fluid should be removed from the transmission and replaced with fresh fluid as the fluid properties degrade with time and use and entrain contaminants and debris which are not fully removed by the filter in the transmission.

Automatic transmissions require transmission fluid because such fluid is employed in part as a driving means within the transmission and is additionally employed to lubricate the internal components within such transmissions. Over time such fluid becomes less viscous and thus less efficient in lubricating such components. It is, therefore, desirable to periodically perform an exchange of fluid to maintain the viscosity of such fluid within the transmission and to maintain the cleanliness of the transmission and thereby increase the useful life of the transmission. A complete exchange of fluid is preferred so that the used fluid as well as undesirable foreign matter contained therein is completely removed and is replaced with new, more viscous fluid.

When considering the typical personal automobile, the process usually involves removing the transmission pan from the transmission and allowing the fluid to drain therefrom. The pan typically holds from 1 to 5 quarts of a total 7 to 15 quart capacity of the transmission. Thus, emptying the pan and then adding that amount of new fluid only serves to dilute the used fluid with some 15–50% of new fluid. After the pan has been drained, it is then reinstalled and new transmission fluid is added through the dipstick tube to bring the transmission to the proper fluid level. However, this process has a significant disadvantage. Specifically, the fluid that is present at a given time in the oil pan is only a small portion of the fluid actually in the transmission. Typically, a good deal of the transmission fluid remains in the control circuits of the transmission, the torque converter and the transmission cooler. Therefore, a traditional transmission fluid change will really only change about one-quarter to one-third of the transmission fluid and the transmission will be forced to operate with a mixture of old fluid and new fluid, thereby reducing its efficiency. More particularly, this invention relates to methods and apparatus in which a cleansing composition is automatically introduced into the transmission to cleanse the entire transmission system and then the fluid is automatically flushed from the transmission as it is being refilled.

In the field of devices for flushing and filling fluids in an automobile engine or transmission, various different embodiments of such apparatus have been known for a number of years and, by way of example, forms of such embodiments can be found in U.S. Pat. Nos. 4,095,673, 4,674,456, 5,056,621, 5,427,202, 5,447,184, 5,456,295, 5,318,080 and 5,626,170.

Prior art flushing and filling apparatus have some disadvantageous features associated with them. For example, flushing and filling automatic transmissions with fluid or oil according to many prior art methods is a relatively time-consuming, cumbersome and inefficient process. The conventional method is to replace the fluid housed in the pan of the transmission. It is difficult to remove all of the fluid and to also clean the interior of the system.

More recently, there have been effort's to change all of the fluid in an automobile's transmission by disconnecting a fluid tube and draining the fluid into a waste oil dump while manually pouring new fluid into the transmission dipstick hole. This procedure has proven to be inefficient, inadequate and so time consuming that it has failed to gain broad popularity.

Another prior method involved disconnecting a transmission fluid cooler line and allowing one end of such cooler line carrying used fluid to drain freely, while the other end of the line was connected to a pressurized tank which injected unused fluid into the cooler line connected to the transmission. One major disadvantage associated with this method is that, in many instances, the rate at which fluid exits the transmission cannot be matched by the rate at which unused fluid is injected into the transmission because the transmission, due to internal resistances, cannot accept fluid at the same rate as the rate at which used fluid is flowed by the transmission pump into an unrestricted cooler line. As such, there is a risk that the fluid seals, rear bearings and other internal components of the transmission could suffer damage due to the progressively diminishing level of fluid in the transmission during such a process. This difficulty is compounded by the fact that the flow resistance varies with the different models of transmissions.

Other work in this field has led to the proposal of a transmission changer including air pressurized tanks for supply and extraction of transmission fluid via the transmission cooling lines. Others use a supply pump device for supplying transmission fluid at a controlled rate to the transmission and a flow control device to control the rate of flow in the supply tube so the volume of unused fluid does not exceed the volume of used fluid flowed from the transmission. So the desired fluid level may be maintained in the transmission throughout the exchange process.

SUMMARY OF THE INVENTION

Briefly and in general terms, the present invention provides an automatic transmission fluid cleaner, removal and replacement device that includes a drain tube that releasably and selectively connects to an additive reservoir and a variable drain reservoir and includes a fill tube releasably connected to a disconnected cooler line that normally conducts used transmission fluid to the radiator of the vehicle, and to a port on the radiator to which the cooler line is normally connected. The drain tube is selectively connected to an additive reservoir and the disconnected cooler line is connected to the additive reservoir such that as the fluid in the transmission is circulated as connected the additive reservoir will be in the line of flow and will inject a cleaning additive into the transmission system and then collectively connected at their other ends to a drain and fill cylindrical tank which has chambers therein which are separated by a rotating wand about it's longitudinal axis to cause used fluid to be collected and new fluid to be injected into the transmission system. The transmission fluid pump is employed to flow used fluid through the disconnected cooler line and into the drain reservoir while the supply pump simultaneously injects unused fluid through the supply tube and into the cooler port of the radiator.

BRIEF DESCRIPTION OF THE DRAWINGS

These, as well as further objects and advantages of the invention, will become apparent to those skilled in the art from a review of the following detailed specification of my invention, reference being made to the accompanying drawings in which.

DETAILED DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Referring now more particularly to the drawings, wherein like numerals represent like elements throughout the specification.

Figure 1:
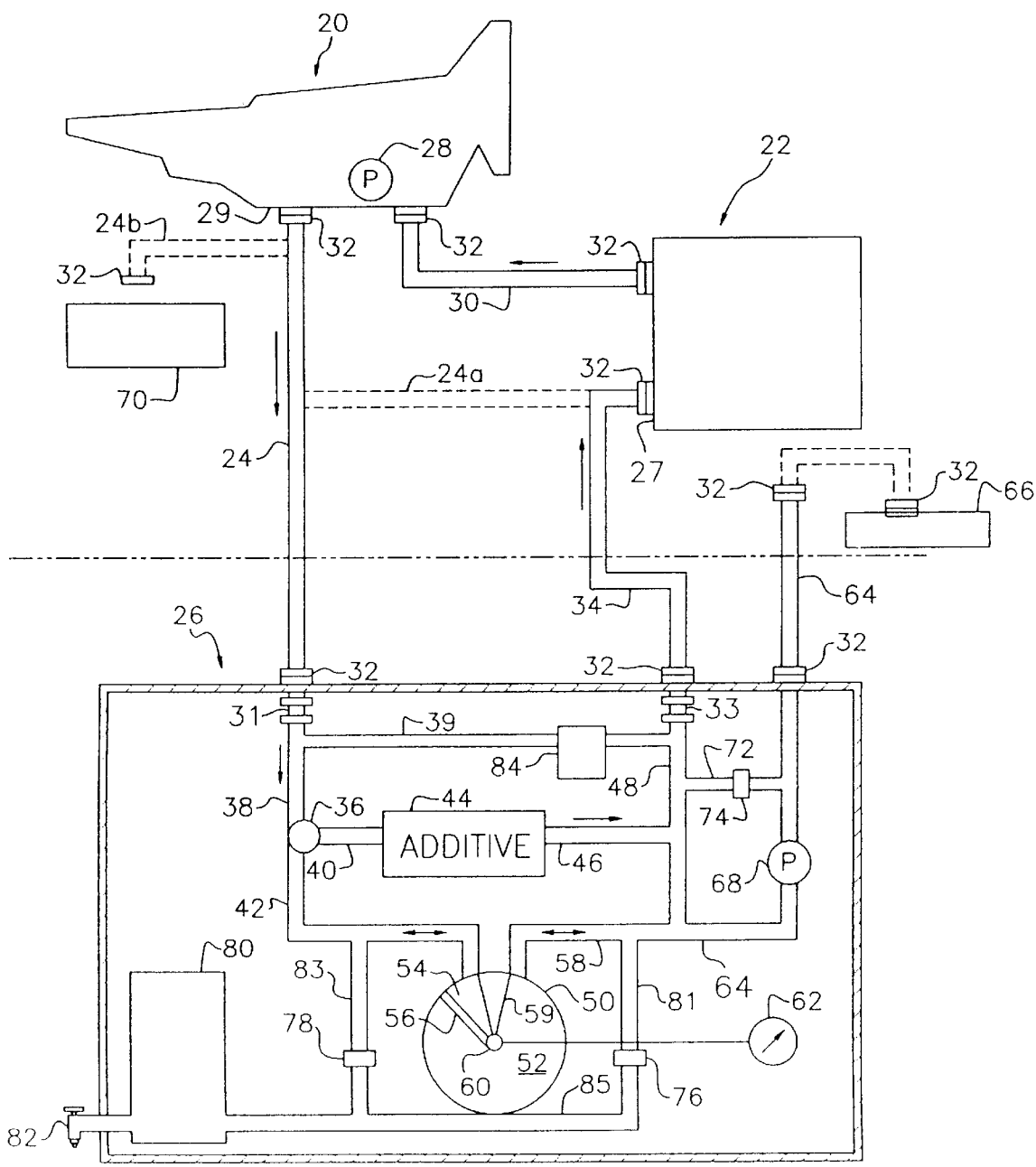
FIG. 1 is a simplified block diagram of the invention showing a transmission fluid reservoir and fluid changing operation and having means for the introduction of additive into the system to change or flush and clean the transmission system, means for collection of the used fluid is a reservoir as fresh fluid replaces the used fluid in the transmission, and means for refilling the reservoir with fresh fluid while collecting the used fluid, with the later means shown in phantom view.

Referring now to FIG. 1, a schematic block diagram of the system is presented. A vehicle transmission 20 and a transmission fluid cooler (radiator) 22 are shown. A first fluid line 24 (output fluid line) is connected from the output side of the transmission to the apparatus for cleaning and flushing the transmission fluid shown generally as 26.

When line 24 is not connected to the apparatus for cleaning and flushing the transmission, the radiator 22 is connected to the transmission 20 as shown by phantom line 24a. This is the normal circuitry of the vehicle. This is the normal connection between the transmission 20 and the radiator 22. Thus, it is intended that one wishing to flush and transfer the fluid from the transmission would interrupt the flow circuit for the radiator 22 and the transmission 20, at the transmission's radiator 22 and cause the present invention 26 to be inserted into the flow circuit of the transmission and its radiator.

Each transmission has therein a pump 28 which has sufficient power to cause the transmission fluid of the transmission 20 to flow from the transmission to radiator 22 and to return to the transmission 20. This causes the transmission fluid to be cooled during normal operation of the transmission. Fluid from radiator 22 flows to transmission 20 through line 30.

One of the two lines 24a and 30, which are the transmissions normal lines of circulation, are disconnected from radiator 22. In the preferred embodiment, line 24 is the discharge line from the transmission. This means that the transmission fluid flows from the transmission through line 24, the flow and pressures associated with this discharge being determined by the parameters of the internal pump 28 of the transmission. Actually, a first adapter hose 24 and a second adapter hose 34 are a part of the apparatus of the present invention and have quick connectors 32 at a mating end. These quick connectors are readily available on the market and snap into place. When they are disconnected, the disconnected end is closed to prevent any fluid flow from the connectors 32. Connectors 32 are connected to the discharge port 29 of the transmission and to the input port 27 of the radiator 22 to cause the fluid to flow from the transmission through the present invention and to radiator 22.

Referring now to the present invention 26 there is provided a two-position switch 36 to selectively connect line 38 to line 40 or line 38 to line 42. When the switch is in "position 1" (flush), line 38 is connected to line 40 and the input to additive reservoir 44 which is configured so that an additive may be introduced from reservoir 44 into the transmission and radiator system. The output of reservoir 44 is connected to said second adapter hose. The additive is any one of many commercially available products which may be added to the transmission fluid to cause the fluid to clean the transmission or to cause the fluid to coat or otherwise "treat" the interior of the transmission 20 and radiator 22 with additive. The internal operating pressure of pump 28 of transmission 20 forces the transmission fluid through lines 24, 38 and 40, through the additive reservoir 44 and then through lines 46, 48 and 34 to return to transmission 20 through radiator 22. This causes all of the fluid in the transmission to be exchanged and treated with the additive. The additive is introduced into all parts of the transmission and radiator and completely flushes the entire system using the old transmission fluid which now has an additive added thereto.

The fluid which now contains the additive is permitted to circulate thorough the system for at least 5 minutes to permit the complete reaction between the additive and the interior of the transmission 20 and radiator 22. During this phase of operation, the operator may view the fluid that is passing through flexible line 24 through viewing window 31 which is a transparent portion inserted into line 24 which may comprise a plastic or glass portion which is contiguous with the line 24. A similar viewing window 33 in inserted into line 34. Switch 36 is then changed from its first position (the one where line 40 and additive 44 and line 46 is in the circuit) to its second position which connects line 38 to line 42.

The viewing windows permit the user of the present apparatus to see the color of the transmission fluid which is indicative of the additive's reaction with the transmission fluid during the first stage of the method for flushing and the second stage of transferring and exchanging the fluid from the transmission. The viewing windows also permit the user to see the color of the fluid which is being removed from the transmission and the fluid which is being introduced into the transmission. The operator thus knows when the cycle has reached its quiescent point.

Transmission fluid exchange means 50 provides a means for causing fresh transmission fluid to be introduced into the transmission while the used transmission fluid is being removed from the transmission circuit, that is, the transmission 20 and the radiator 22. The transmission fluid exchange means 50 comprises a reservoir which has a first compartment or chamber 52 and a second compartment or chamber 54, each of which are variable in volume, dependent upon the location of wand 56 relative to bulkhead 59. The particular structure of this means will be explained further hereinafter. For the purpose of understanding the invention as set forth in FIG. 1, it can be appreciated that as wand 56 moves in a counterclockwise direction, compartment 54 will increase in volume while compartment 52 will decrease in volume.

As fluid enters compartment 54, via lines 24, 38 and 42, wand 56 will be forced by the pressure of the transmission fluid in line 42 to rotate counterclockwise due to the pressure generated by pump 28 in transmission 20. As the wand moves, the transmission fluid that is contained in compartment 52 is forced through lines 58, 48 and 34 into radiator 22 and then through line 30 to transmission 20.

Wand 56 rotates about a central axis 60 which has a means 62 (FIG. 5) associated therewith which indicates the rotational position of wand 56 to thus indicate the amount of fluid that has been transferred from chamber 52 into the transmission circuit.

Figure 5:
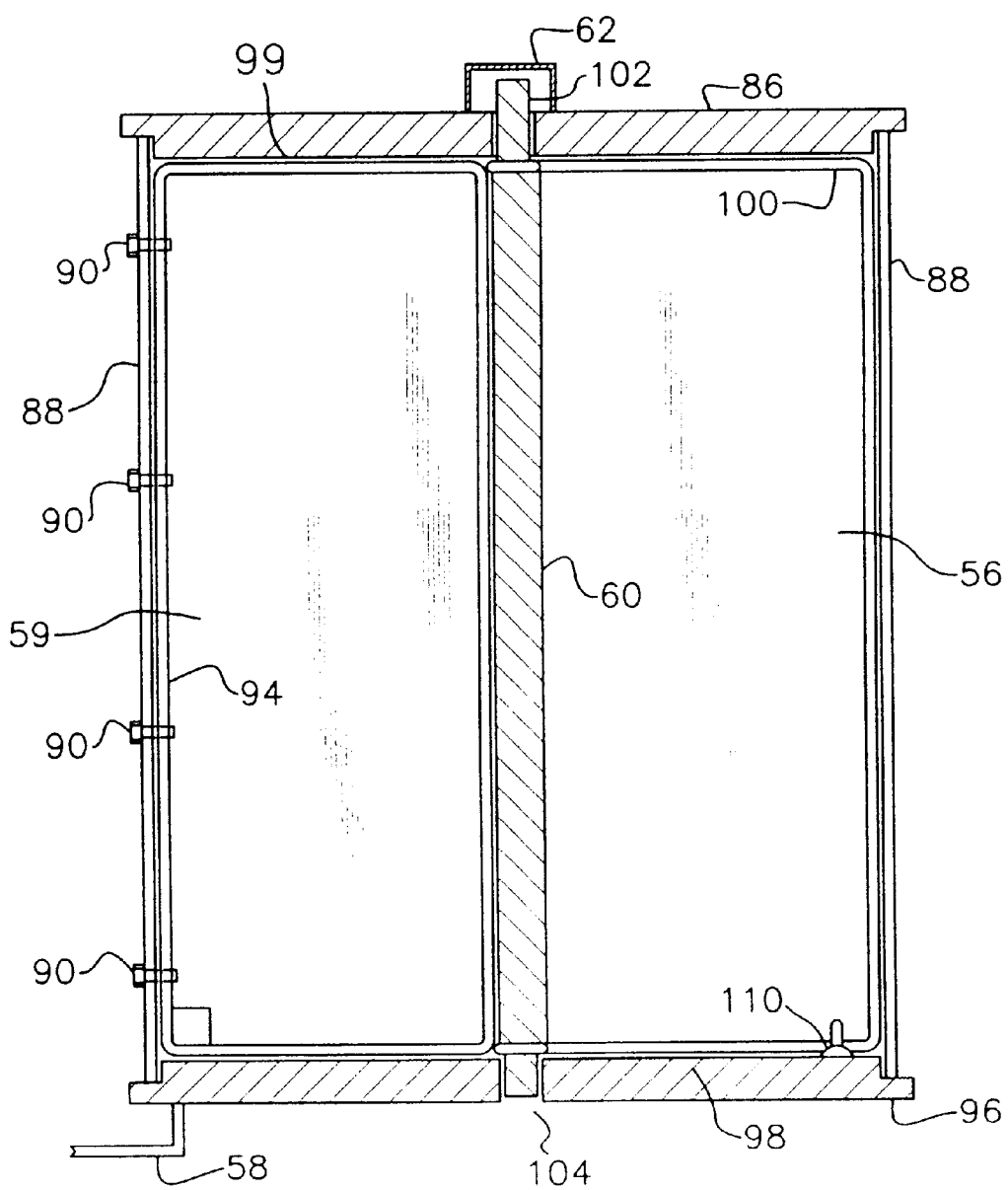
FIG. 5 is a cross-sectional view of the means for exchanging the fluid shown in FIG. 6.

Referring to FIG. 5 and FIG. 1, wand 56 and central axis 60 have a sensor 62 associated therewith which indicates the physical position of wand 56 with respect to compartment 54 and compartment 52. Sensor 62 thus indicates the amount of fluid which is contained in compartment 52 and consequently the amount of fluid which has been removed from compartment 52 and thus has entered into the transmission 20 and radiator 22. Different transmissions contain different amounts of fluid ranging from 7 to 15 quarts.

As will be explained below, the operator of this invention can cause fresh transmission fluid to be introduced into chamber 52 in a predetermined amount before the present apparatus is connected to the vehicle or after the apparatus is connected to the vehicle. The present apparatus is connected to the vehicle while the engine is turned off. If the fluid is introduced into chamber 52 after the present apparatus has been connected to the vehicle, the engine is turned off during this portion of the cycle for flushing and transferring the fluid from the transmission circuit. Actually, there need not even be an engine in the system at this time since the present invention may be filed and be ready for use in flushing and transferring transmission fluid. "Filled" means that chamber 52 is filled with the new transmission fluid and chamber 54 is empty, the fluid from chamber 54 having been expelled from chamber 54 through line 42 and 24b (shown in phantom in FIG.1) into an external reservoir 70 through line 24b. Line 24 is disconnected from transmission 20 and caused to be connected to waste reservoir 70 as shown by phantom line 24b.

Filling of chamber 52 is accomplished through the means for filling reservoir 50 and, in particular, chamber 52. Replenishing line 64 is connected by the operator or connected permanently to a reservoir of fresh transmission fluid 66 for the introduction of transmission fluid from the reservoir into chamber 52. This may occur in two different ways.

The first way may be that the new transmission fluid to be introduced into the present invention may be under pressure in reservoir 66 so that when one connects line 64 to the reservoir that the fluid in reservoir 66 will be forced into chamber 52, through lines 64, 72, 48, and 58, without the need of pump 68. If that is the case, then the fluid may flow through line 64, and through line 72, flow valve 74 and line 48 and line 58, into chamber 52. At this point in time in the process, line 34 is not connected to radiator 22. When connector 32 (line 34) is removed from the radiator, the connector is automatically closed. This type of connector is readily available on the market. As the quick disconnect coupling is engaged, it is open to fluid flow and closed to fluid flow when it is not connected to a fitting.

The second means for filling new fluid reservoir 50 would be for the operator to connect line 64 to reservoir 66 and then to cause pump 68 to pump the transmission fluid from reservoir 66 into chamber 52 by way of lines 64 and 58. As the fluid is pumped into reservoir 52, the pressure of the fluid causes wand 56 to move or rotate in a clockwise direction to thus expel the spent fluid, the used fluid, from chamber 54 through lines 42 and 24 (24b shown in phantom) into waste reservoir 70. Preparatory to removing the fluid from chamber 54 and filling chamber 52 in either of the above mentioned fashions, the operator must remove line 24 from the transmission by way of quick disconnect coupler 32 and cause line 24 to be disposed so that the used transmission fluid will be emptied into waste reservoir 70. This is shown in phantom lines 24b in FIG. 1.

There is a flow valve 74 located in line 72 to thus enable the fluid from reservoir 66 which is under pressure to flow through line 72 and lines 48 and 58 into chamber 52 to fill chamber 52. As a safety precaution, there is provided a pressure regulated flow valve 76 joined to line 58 and a pressure regulated flow valve 78 connected to line 42 such that line pressure in line 58 or line 42 in excess of a predetermined limit, for example, 75 psi, will cause the release of such pressure and the oil reposed in line 58 or 42 may be vented through lines 81, 83 and 85 to safety reservoir 80 which may ultimately be drained or emptied through valve 82.

There is also a pressure sensitive valve 84 located between line 38 and line 48 in line 39. Should the pressure in line 39 exceed the pressure limits of pressure sensitive valve 84, then the fluid in line 38 will pass through line 39, the pressure sensitive valve 84 and into line 48 and begin to cycle through the radiator 22 and transmission 20.

Figure 9:
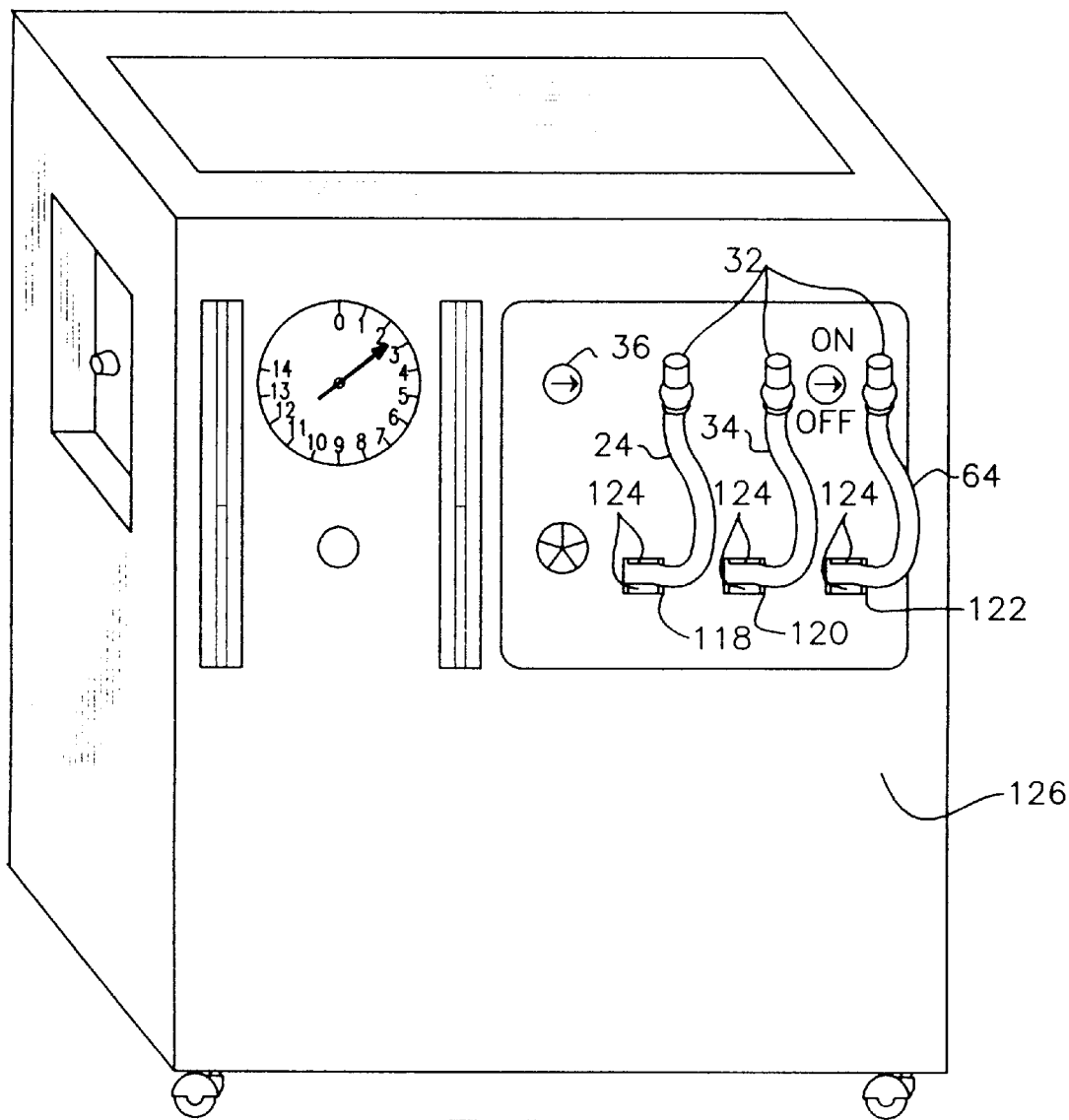
FIG. 9 is a an elevation pictorial view of the cabinet of the present invention as it will appear when not connected to a vehicle.

A perspective view of the transmission flush and transfer apparatus is shown in pictorial form in FIG. 9. Fill line 64 is shown in the stored position, that is, it is not connected to a source of fresh transmission oil for introducing the fluid into chamber 52. Line 24 which serves to cause the old transmission fluid to circulate to the flush apparatus 26 while line 34 is used to cause the transmission fluid to be connected to radiator 22 and then through line 30 back to the transmission 20 to complete the cycle, as shown in FIG. 1. When the present invention is not in use, lines 24, 34 and 64 are all retracted within the housing of the present invention.

Figure 3:
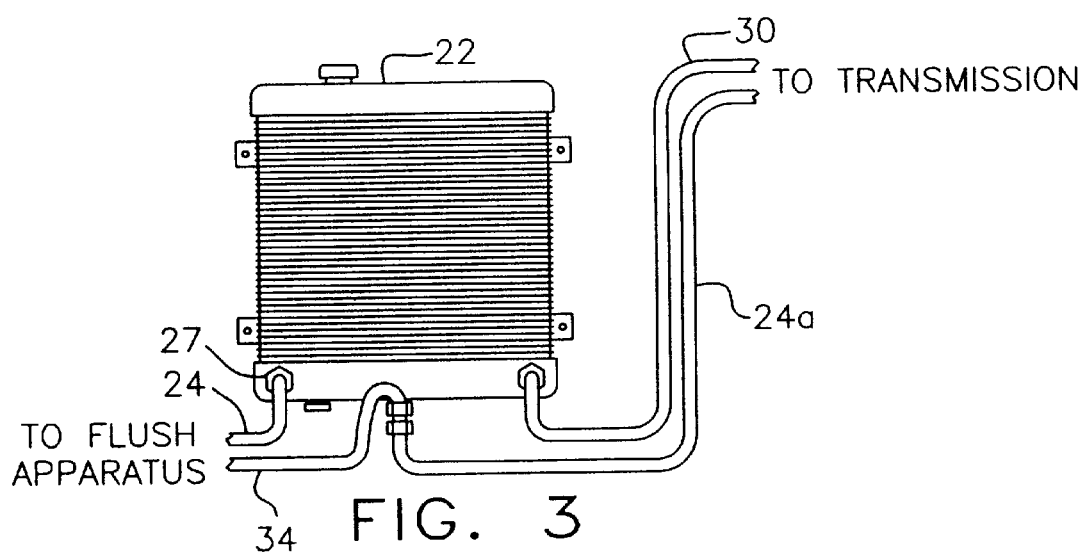
FIG. 3 is a view of the radiator of a vehicle showing the connection from the radiator to the transmission and to the present invention as it connects to the radiator.

FIG. 3 shows a radiator with the present invention connected thereto. When the present apparatus is not connected to the radiator, line 24a is connected to the radiator at 27. When line 24a is disconnected from radiator 22, it is connected to line 34 of the present invention. The embodiment shown in FIG. 3 is with the present invention connected to the radiator and transmission as further shown in FIG. 1.

Figure 6:
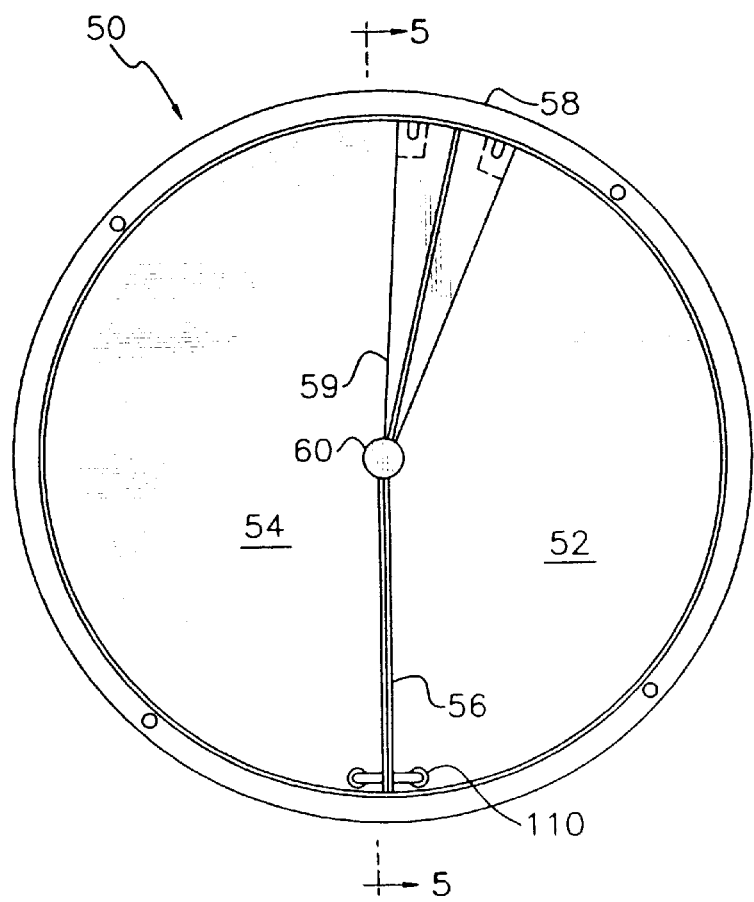
FIG. 6 is a cross-sectional top view of the means for exchanging the fluid shown in FIG. 4.
Figure 4:
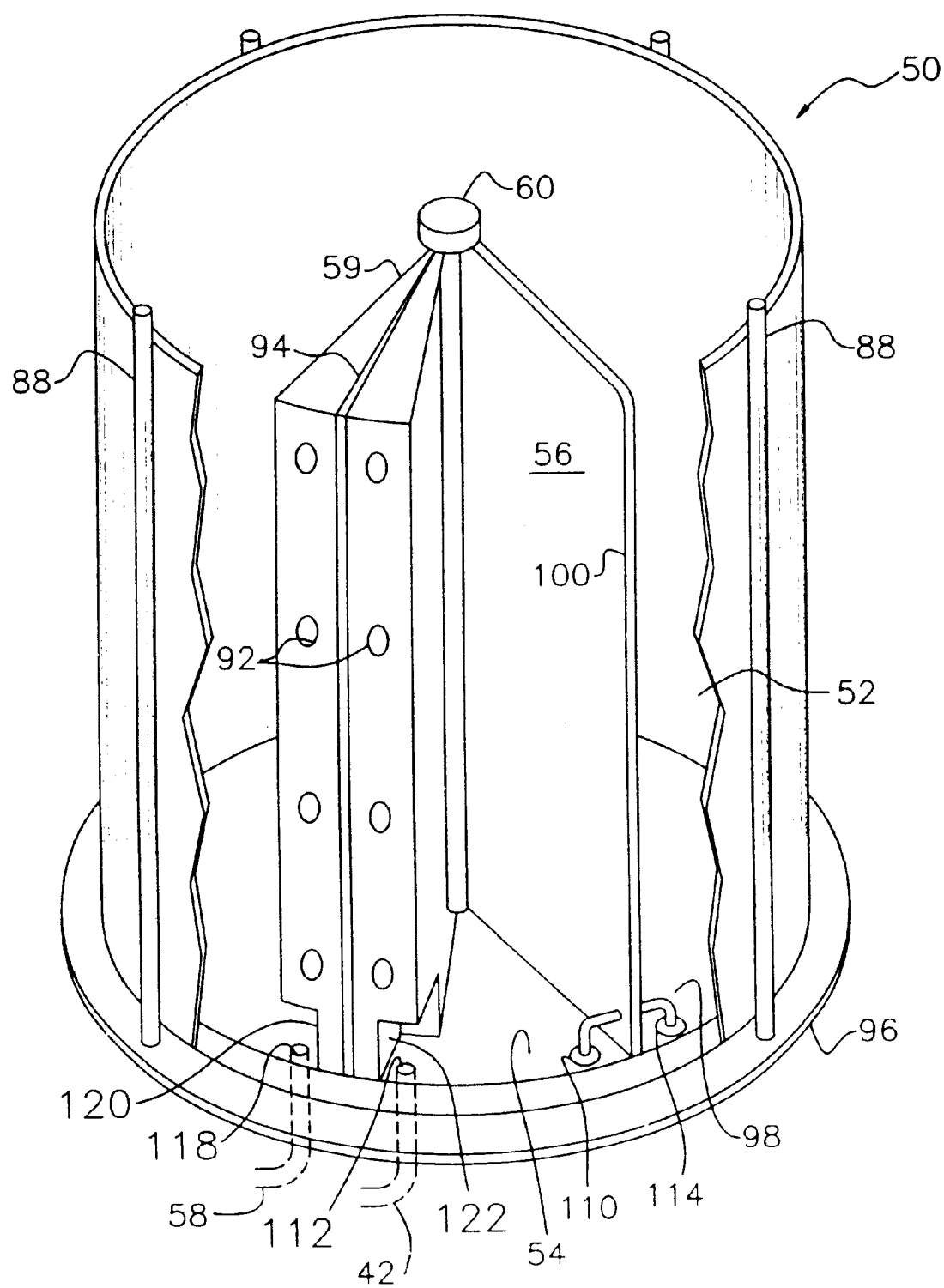
FIG. 4 is a fragmentary perspective view of the means for exchanging the fluid with the top removed.

Referring now to FIGS. 4, 5 and 6, reservoir 50 is shown in detail. Reservoir 50 is shown in FIG. 4 in partial cross-section with the top 86 (FIG. 5) removed. Bulkhead 59 is fixedly disposed within reservoir 50 between axis 60 and the outside 88 of said reservoir. Bulkhead 59 is secured to the outside wall 88 of reservoir 50 by bolts 90 (FIG. 5) into female receptacles 92 shown in FIG. 4. Bulkhead gasket 94 surrounds the entire periphery of bulkhead 59 and forms a secure seal between the outside wall 88 of reservoir 50, top 86 of reservoir 50 (FIG. 5), the axis 60 and bottom 96. Bottom 96 and top 86 have an elevated surface which conforms to the diameter of reservoir 50. Bottom 96 has an elevated bottom surface 98 which matingly engages or inserts inside wall 88 of reservoir 50 as can best be seen in FIG. 5 and in FIG. 8 which is an exploded view of reservoir 50. Top 86 has an elevated surface 99 which is disposed downwardly to matingly insert inside wall 88 of cylinder 50 referred to as the reservoir 50.

Figure 7:
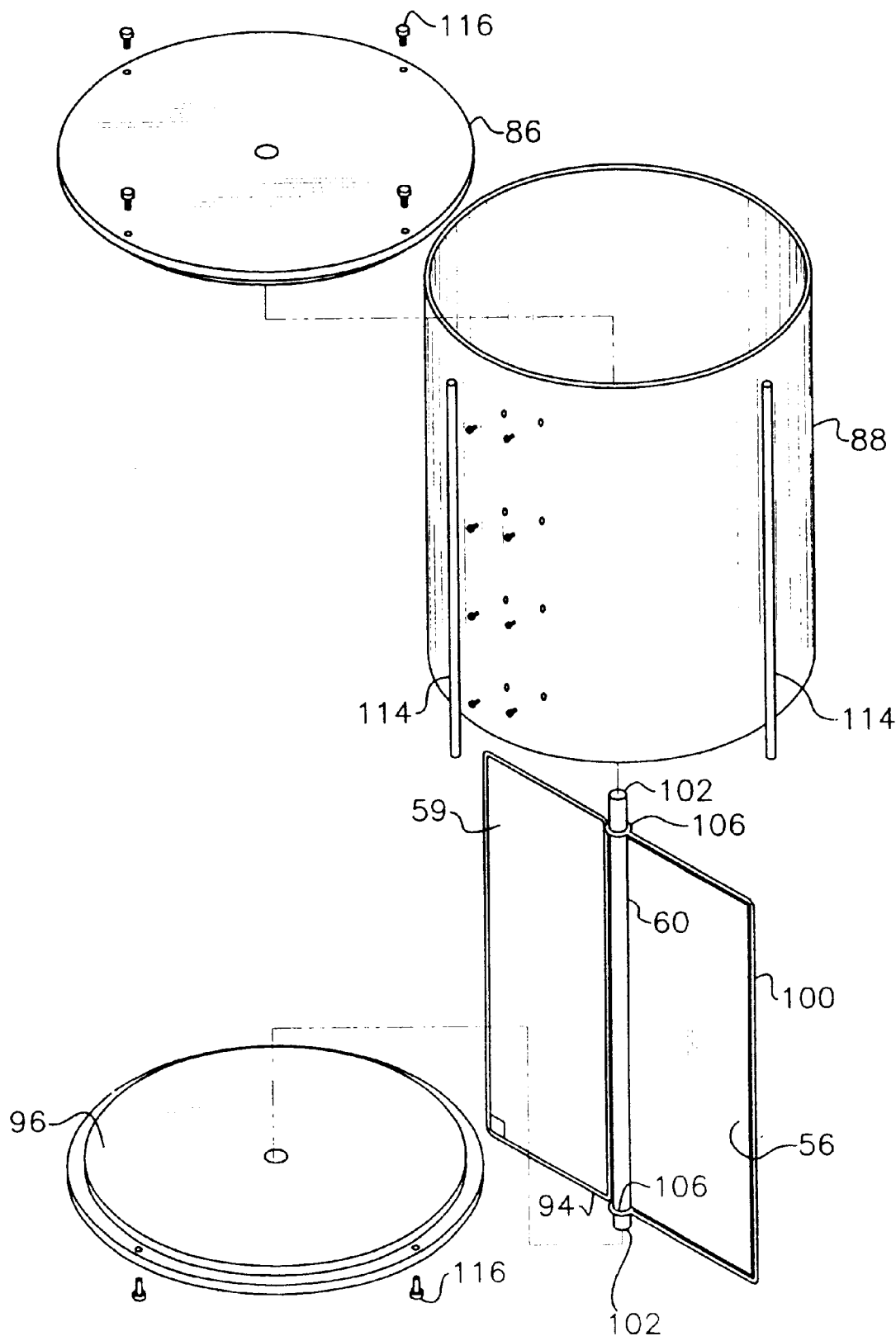
FIG. 7 is an exploded view of the means for exchanging the fluid shown in FIGS. 4–7.
Figure 8:
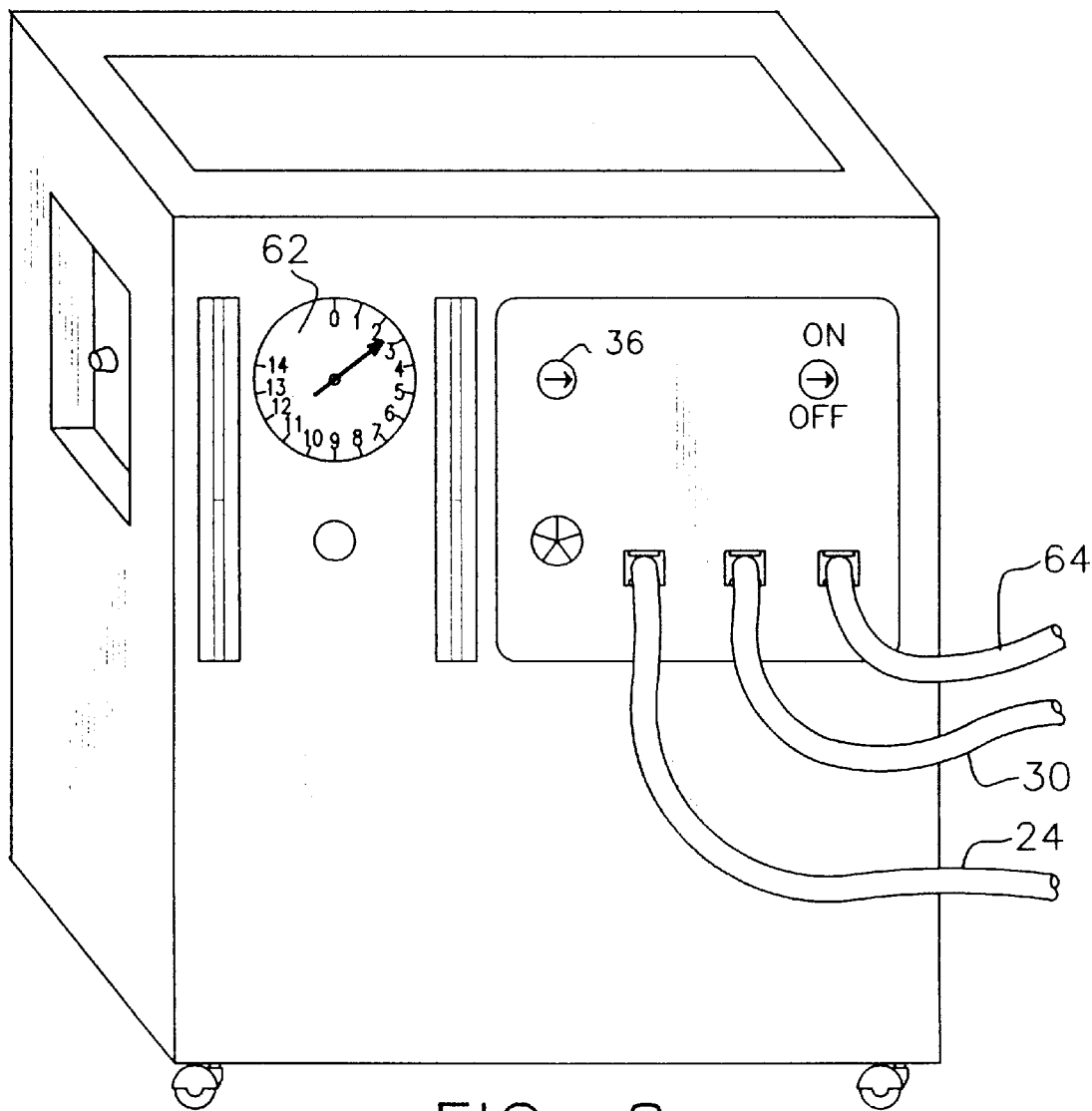
FIG. 8 is a an elevation pictorial view of the cabinet housing for the present invention as it would be seen when the apparatus is connected to a vehicle (not shown).

Referring to FIG. 4 and FIG. 8, wand 56 is permanently joined to axis 60. Axis 60 has a reduced diameter 102 at both ends which matingly engages into recesses 104 which are located in top 86 and bottom 96. Wand gasket 100, as shown in FIG. 7, has a collar 106 at each end which collar 106 is positioned about the respective ends of axis 60 at the reduced diameter portion thereof denoted as 102. When gasket 100 is in place, it conforms to the top, bottom and outside end of wand 56 where the portions of wand 56 are positioned against elevated surface 99 of top 86 and elevated surface 98 of bottom 96 and the outside wall 88 of cylindrical reservoir 50. This forms a seal which prevents leakage of fluid thereabout.

Referring now to FIG. 1 and FIG. 6, as new fluid is introduced into chamber 52 through line 58, the pressure of the entering fluid causes wand 56 to rotate counterclockwise as the chamber fills. As the new fluid enters chamber 52, the movement of wand 56 forces the fluid in chamber 54 out through line 42, line 38 and line 24 when line 24b is connected to waste reservoir 70 as show in phantom lines 24b in FIG. 1.

As chamber 54 is emptied and chamber 52 is filled, stopper 110 engages with outlet 112 (FIG. 4) which is connected to line 42 to stop further fluid from leaving the chamber. When one is causing the fluid from transmission 20 to flow into chamber 54, the fluid pressure pushes stopper 110 upwardly to permit fluid flow from transmission 20 into chamber 54. When fluid in flowing from transmission 20 into chamber 54 and from chamber 52 through lines 58, 48, and 34 into radiator 22, the apparatus is in the transfer mode which introduces new transmission fluid from chamber 52 into the transmission circuit as old fluid is removed from transmission 20 into chamber 54 through lines 24, 38 and 42. When the circuit is in this mode, switch 36 is set to the transfer mode. Reservoir 50 thus permits fluid to be introduced into the transmission circuit and removed therefrom in exact proportions, that is, the amount of fluid removed is exactly equal to the amount of fluid being introduced into the transmission circuit.

Likewise, when chamber 52 is near-empty, stopper 114 engages with outlet 118 to stop further fluid from leaving reservoir 52. Fresh transmission fluid flows through line 58 and presses fluid stopper 114 upwardly to permit new fluid to enter chamber 52.

Referring to FIG. 4, bulkhead 59 has a recessed notch in said first chamber and in said second chamber which is located above fluid outlet 118 and fluid outlet 112. This permits stopper 110 and stopper 114 to engage said fluid outlets 112 and 118, respectively, and wand 56 rotates from one extreme position to the opposite extreme position, thus permitting the fluid in said chambers 52 and 54 to be substantially empty of fluid. Stopper 110 and stopper 114 are fixedly disposed near the bottom of wand 56 and positioned such that the stopper will cover opening 112 and 118, respectively.

Referring now to FIG. 4 and FIG. 5, one can see that the entire reservoir 50 is assembled by fixedly positioning bulkhead 59 to outer wall 88 of reservoir 50 by bolts 90. Axis 60 and thus wand 56 which constitute an unitary member is positioned in the recess 104 of bottom 96 and top 86 is positioned to receive the reduced portion 102 of axis 60 thereinto so that bulkhead 59 and wand 56 are fixedly positioned inside reservoir 50. To hold top 86 and bottom 96 in a secure position and to thus cause want 56 to be rotatably disposed inside reservoir 50 and to define chambers 52 and 54, cylindrical rods 108 are positioned to secure top 86 to bottom 96 by bolts 116 which pass through top 86 and bottom 96 to threadably connect with the ends of rods 108.

Figure 2:
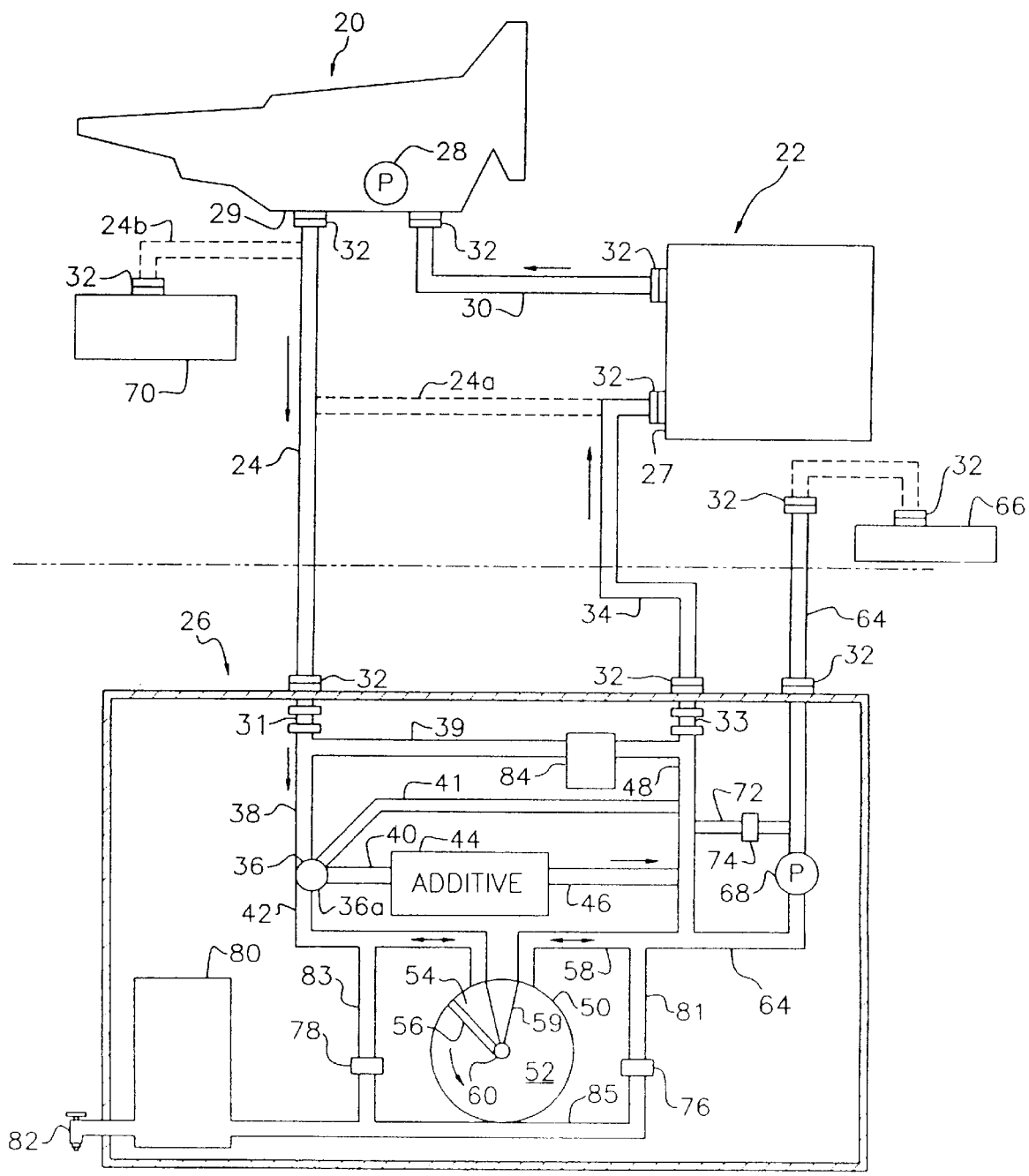
FIG. 2 is a simplified block diagram of an alternative embodiment of the invention showing a by-pass line 41 for the fluid to circulate through the transmission and radiator while connected to flush transmission apparatus and means for automatically causing the transmission to be flushed and exchanged.

Referring now to FIG. 2, there is shown an alternative embodiment of the present invention which is automated in that switch means 36a comprises a programmable switching means, which is readily available on the open market. A special purpose computer controlled switching means is programmable so that the operator may predetermine the amount of time that line 38 is connected to line 41 before line 38 is then connected to line 40 before line 38 is then connected to line 42 before line 38 is then again connected to line 41 to complete the cycle. The various times in which each phase is to be active may be predetermined based upon the particular vehicle being serviced, the amount of additive and the time the additive is to be circulated through transmission 20 and radiator 22 and then the amount of time that the old fluid will be permitted to be forcibly removed from the transmission circuit into chamber 54 and new fluid introduced into the transmission circuit from chamber 52. The term "transmission circuit" refers to the normal fluid circulation path from transmission 20 through radiator 22 and back to transmission 20.

While different embodiments available to one skilled in the art may be utilized to accomplishing the selective switching process, a three (3) position switch 36a readily available on the open market is adapted to automatically cause the flush and transfer cycles to be implemented and then to return to a position where the fluid from the transmission is circulated from transmission 20 to radiator 22 when the transmission circuitry is connected to the present apparatus.

When switch 36a is in a first position, it causes line 38 to be connected to line 41 and to line 48 and line 34 for a return to radiator 22. With this connection, the automobile may be running after the present invention apparatus is connected into the transmission circuitry and before the flush cycle is activated. The flush cycle refers to the circuit where the additive 44 is being introduced into the transmission fluid.. Thus, one may have the engine running before the flush cycle and the transfer cycle are activated and after the flush and transfer cycled are completed and while the present apparatus is connected into the transmission circuitry.

In application, one would interrupt the line 24a (FIG. 2) which normally connects radiator 20 to transmission 22 and cause line 24 to be connected to transmission 20 and line 34 to be connected to radiator 22. When the apparatus is so connected, the transmission fluid may flow from the transmission to the radiator as if the line 24a had not been interrupted. Should programmable switching means 36a malfunction so that no fluid is permitted to flow from transmission 20 to radiator 22 and through the present apparatus while the engine is running, then the increase in pressure will be relieved through line 39 by pressure sensitive valve 84.

When the programmable switching means 36a is activated, the process or method of the present invention will automatically and predictably proceed through the process to completion. The engine of the vehicle would then be turned off and line 24 disconnected and line 32 disconnected with line 24a being connected so that the vehicle's transmission 20 will be directly connected to radiator 22 as it was before one undertook to flush the transmission.

I claim:

1. A total fluid exchange system for vehicles having an automatic transmission and a fluid cooling circuit including the transmission and a fluid cooler with interconnecting fluid flow lines therebetween, said system including:
   a. means for interconnecting the system into a selected one of the fluid flow lines;
   b. means for introducing an additive into the transmission and fluid cooling circuit prior to fluid exchange to aid in cleansing of said automatic transmission and said fluid cooling circuit;
   c. a source of fresh fluid for exchange with used, spent fluid existing in the circuit;
   d. transmission fluid exchange means for proportionately exchanging used, spent fluid in the transmission and the fluid cooling circuit with new fluid;
   e. means for determining the clarity of the used, spent fluid and the clarity of the fresh fluid to determine the total replacement of the used, spent fluid with fresh fluid.

2. A total fluid exchange system for vehicles as set in claim 1 wherein said transmission includes a pump for pumping fluid out of said transmission and through said fluid cooling circuit and means for interconnecting the system into a selected one of the fluid flow lines comprises:
   a. a set of adapter hoses comprising a first adapter hose and a second adapter hose, said first adapter hose configured to connect with said transmission at the line where said pump is causing fluid to be expelled from said transmission and said second adapter hose configured to connect to said fluid cooling circuit where said fluid enters said cooling system, said first adapter hose and said second adapter hose including respective end fittings sized and configured for mating with the respective said connection ports of said transmission and said cooling circuit and
   b. a pressure relief valve connected between said first adapter hose and said second adapter hose whereby the pressure of fluid flowing from said transmission and to said cooling circuit is maintained below a predetermined pressure.

3. A total fluid exchange system for vehicles as set forth in claim 2 herein said means for introducing an additive into the transmission and the fluid cooling circuit to aid in cleansing of said transmission and said fluid cooling circuit comprises:
   a. an additive reservoir having an input port and an output port, said reservoir being configured to contain an additive and
   b. a transfer and flush switch having a first (flush) position and a second (transfer) position;
      said transfer and flush switch being connected to said first adapter hose to selective connect said first adapter hose to the input of said additive reservoir and to selectively connect said first adapter hose to said transmission fluid exchange means and
      wherein the output of said additive reservoir is connected to said second adapter hose whereby fluid flowing from said transmission is caused to flow through said additive reservoir and to said cooling system to introduce said additive into the fluid of said transmission and said fluid cooling circuit to flush said system to thus aid in cleansing of the fluid and the interiors of said transmission and said cooling circuit.

4. A total fluid exchange system for vehicles as set forth in claim 3 wherein said transmission fluid exchange means for proportionately exchanging used, spent fluid in the transmission and the fluid cooling circuit with new fluid comprises:
   a. a hollow cylindrical member having an inside circumference and an outside circumference, a first detachable end (top) and a second detachable end (bottom) and an axis along the center of said cylindrical member between said top and said bottom thereof;
   b. a fluid exchange reservoir having a first chamber and a second chamber which are proportionately variable in volume and disposed within said cylindrical member;
   c. a first fluid outlet connected to said first chamber for supplying fluid to and from said first chamber and a second fluid outlet connected to said second chamber for supplying fluid to and from said second chamber;
   d. a wand having a top, a bottom, an inside edge, an outside edge and a first side and a second side, positioned inside said cylindrical member with said inside edge rotatably mounted between said first detachable end (top) and said second detachable end (bottom) and constituting said axis thereof and variably separating said first chamber and said second chamber;
   e. a bulkhead permanently positioned between said top, said bottom, said axis and said inside circumference of said cylindrical member and forming a permanently positioned separation between said first chamber and said second chamber;
      wherein said first chamber is formed between said wand and said bulkhead and said second chamber is formed between said wand and said bulkhead with said wand variably separating said first chamber and said second chamber and
      wherein during said transfer cycle said transfer and flush switch is positioned in a second position for transfer of the old fluid from said transmission and said cooling system, and
      wherein fresh fluid is contained in said second chamber which is connected to said fluid cooling circuit and
      wherein said first chamber is connected to the output port of said transmission to receive the spent fluid from said transmission, and
      wherein, used transmission fluid from said transmission is expelled therefrom by said pump of said transmission into said first chamber, the force of said fluid causing said wand to rotate about said axis to cause transmission fluid in said second chamber to be forcibly removed therefrom and into said cooling system,
      whereby, the new fluid in said second chamber is introduced into said transmission and said fluid cooling circuit as old spent transmission fluid is received from said transmission into said first chamber.

5. A total fluid exchange system for vehicles as set forth in claim 4 wherein said bulkhead further comprises a concave chamber facing into said first chamber and a concave chamber facing into said second chamber, said concave chamber facing into said first chamber being positioned above the fluid outlet from said first chamber and wherein said concave chamber facing into said second chamber is positioned above the fluid outlet from said first chamber.

6. A total fluid exchange system for vehicles as set forth in claim 5 wherein said wand further comprises a first stopper and a second stopper, said first stopper being fixedly disposed on said first side of said wand near said outside edge of said wand and in said first chamber of said fluid exchange reservoir and said second stopper being fixedly disposed on said second side of said wand near said outside edge of said wand and in said second chamber of said fluid exchange reservoir and wherein said first stopper is disposed for matingly engaging said fluid outlet from said first chamber of said fluid exchange reservoir to prevent fluid flow through said fluid outlet when said wand rotates so that said first side of said wand substantially engages a first side of said bulkhead and wherein said second stopper is disposed for matingly engaging said fluid outlet from said second chamber of said fluid exchange reservoir to prevent fluid flow through said fluid outlet when said wand rotates so that said second side of said wand substantially engages a second side of said bulkhead.

7. A total fluid exchange system for vehicles as set forth in claim 6 to further comprise a sensor, said sensor being connected to said wand to indicate the position of said wand to thereby indicate the volume of said first chamber and the volume of said second chamber.

* * * * *